United States Patent [19]

Taylor

[11] 4,119,946

[45] Oct. 10, 1978

[54] COMPARISON APPARATUS, E.G. FOR USE IN CHARACTER RECOGNITION

[75] Inventor: Wilfred Kenelm Taylor, Richmond, England

[73] Assignee: National Research Development Corporation, London, England

[21] Appl. No.: 798,991

[22] Filed: May 20, 1977

[30] Foreign Application Priority Data

May 25, 1976 [GB] United Kingdom ............ 21674/76

[51] Int. Cl.² .......................................... G06K 9/12
[52] U.S. Cl. ........................ 340/146.3 Q; 340/146.2
[58] Field of Search ............. 340/146.3 Q, 146.3 MA, 340/146.2; 364/728

[56] References Cited

U.S. PATENT DOCUMENTS

| | | | |
|---|---|---|---|
| 3,187,305 | 6/1965 | Chiang | 340/146.3 Q |
| 3,576,534 | 4/1971 | Steinberger | 340/146.3 MA |
| 3,849,762 | 11/1974 | Fujimoto et al. | 340/146.3 Q |
| 3,878,509 | 4/1975 | Kikuchi et al. | 340/146.3 Q |
| 3,905,018 | 9/1975 | Gray | 340/146.3 Q |
| 4,014,000 | 3/1977 | Uno et al. | 340/146.3 Q |

*Primary Examiner*—Leo H. Boudreau

*Attorney, Agent, or Firm*—Blanchard, Flynn, Thiel, Boutell & Tanis

[57] ABSTRACT

A succession of signals forming the components of an input vector are compared simultaneously with a plurality of reference vectors as the components of the reference vectors are read out in time parallel fashion from a plurality of registers. The comparisons are effected component by component by a plurality of comparators, one per reference vector. The outputs of the comparators are applied to respective integrators or accumulators. At the completion of the comparisons, that integrator or accumulator which stores an extreme value in a predetermined sense indicates the reference vector with which the input vector matches most closely. The vectors may represent characters or samples of waveforms such as speech waveforms, for example, and the invention may be applied to optical character recognition, speed recognition and so on. The apparatus can be implemented from standard, off-the-shelf solid state circuits and avoids the need for purpose built circuitry, such as fusible resistor matrix read-only memories and, therefore, avoids the additional expense and lack of flexibility of such circuitry.

16 Claims, 15 Drawing Figures

DIFFERENT As  DIFFERENT Bs
OUTPUTS $V_{OR}$ FROM FIG. 1 GROUPED INTO SETS

ANY A

ANY B

ANY A & ANY B

COMPARISON APPARATUS, E.G. FOR USE IN CHARACTER RECOGNITION

The present invention is concerned with the comparison of vectors in the form of ordered series of scalar components and relates to apparatus for comparing a vector which is to be recognised, referred to herein as the input vector, with a plurality of reference vectors so as to ascertain with which reference vector the closest match occurs. It will be understood that, in such apparatus the magnitudes of the vector components are given a signal representation which may in particular be a voltage level although it is also known to use other electrical signals, pneumatic signals or magnetic signals, e.g. in the form of bubble domains.

Although the invention may be employed when components are permitted more than two levels, the invention is of particular utility when components are binary quantities and vectors are therefore binary words. The results of individual comparisons between bits of the input vector and bits of a reference vector are then also binary quantities which have one value when two compared bits are alike (both 1 or both 0) and have the other value when two compared bits are not alike.

One field in which comparison of vectors is of particular interest is that of pattern recognition. Patterns to be recognised and reference patterns are analysed into a number of cells for each of which a corresponding component of a vector is given a value in correspondence with the parameter of the pattern which is of interest. If we are concerned only with binary values, the parameter of interest may be whether the cell is black or white in the case of character recognition. Other examples of application of the invention are given below.

We have already described in our British Patent Specifications Nos. 1,337,589 and 1,427,519, with the same inventor as the subject application, apparatus in which all bits of a binary input vector are compared simultaneously with all bits of all binary reference vectors which are stored in a resistor matrix PROM (programmable read-only memory). Such apparatus indicates the number or class of the stored reference vector that most clearly resembles the input pattern vector according to a Hamming distance measure of similarity. An input pattern vector that is identical to a particular reference pattern vector has all bits matching and is therefore at zero Hamming distance from that reference vector. In practice it is nearly always found that a perfect match does not exist and the closest match is then selected, providing that the discrepancy does not exceed a reject threshold. The resistor matrix PROM is a simultaneous parallel memory in that all components of the input vectors and stored vectors are compared simultaneously in parallel. It thus gives the highest possible speed but there are applications of pattern recognition in which a lower speed is acceptable and according to the apparatus to be disclosed it is then possible to employ a combination of serial and parallel processing that enables recently developed LSI microcircuits to achieve the results that were obtained by purely parallel processing in the apparatus described in the above-mentioned patent specifications. This has a number of advantages. Firstly it is possible to use "off the shelf" components instead of purpose-built PROM's, which have the disadvantage of requiring a large number of external pins. Secondly the apparatus is considerably more flexible in its use, as will become apparent from the ensuing description, and overcomes the problem created by the impracticability of changing reference vectors after the initial programming of a PROM has been effected. According to the present invention, there is provided apparatus for comparing vectors, comprising a plurality of registers for storing a plurality M of reference vectors each having N components represented by corresponding signals, M comparison devices each adapted to compare $n$ components of an input vector with $n$ components of its corresponding reference vector, where $n$ is unity or another integer small compared with N, and to provide a comparison signal representing the results of the comparison, means operative in a succession of comparison operations to present the components of the input vector $n$ at a time simultaneously to all of the comparison devices and concurrently to present the corresponding components of the reference vectors from the said registers to the respective comparison devices, and a plurality M of summating devices operative to accumulate output signals in response to the comparison signals from the M comparison devices respectively to provide output signals at the conclusion of the comparison operations, that output signal whose value is at one extreme of the range of values of the output signals denoting the reference vector with which the input vector makes the closest match.

In a preferred embodiment of the invention in which the vectors are binary words representing patterns M, N-bits reference vectors are held in M, N-bit registers, into which they have been written previously in serial or parallel and from which they are read out sequentially, under the control of clock pulses, and all M outputs are compared in parallel, bit by bit, with the N-bit input pattern vector as it is also read out sequentially from an input register, the M results of the comparisons at each step being summated or integrated in M summating units. Thus, after all N bits have been compared, the mth summating unit contains a sum that represents the Hamming distance of number of bits in the input pattern vector X that do not match the bits in corresponding bit positions in the mth stored pattern vector $X_m$ (for $m = 1, 2, --- M$). The final step in the recognition process takes place in parallel at the $(N + 1)$th time interval (clock pulse) by means of a parallel comparator circuit described in the aforesaid British Specification No. 1,427,519.

In the preferred form of the apparatus, the M comparisons are performed by exclusive-OR gates and the M summations by analog integrators although the outputs of the gates could be treated as pulses which are counted by digital summating devices.

The invention will be described in more detail, by way of example, with reference to the accompanying drawings, wherein.

Figure 1:
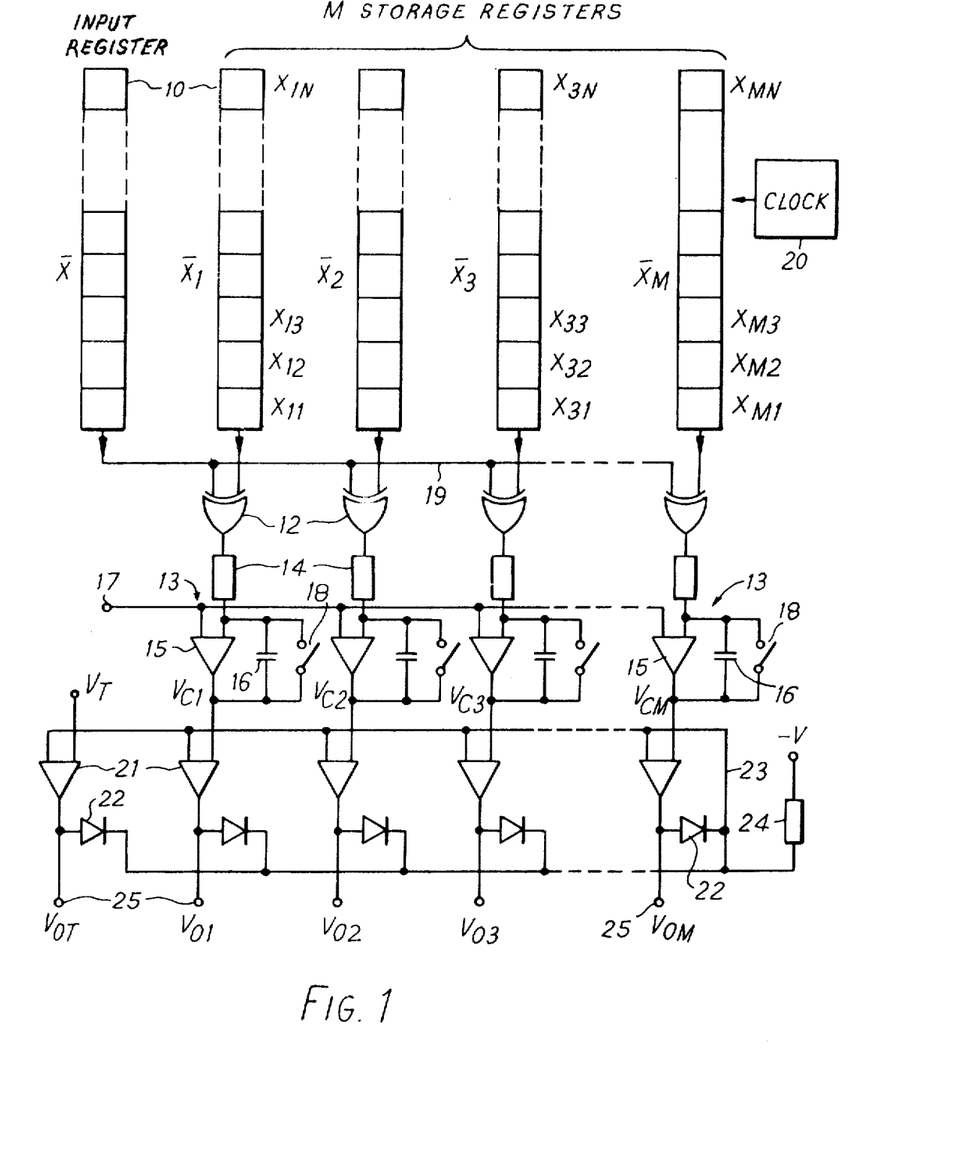
FIG. 1 is a block diagram of apparatus embodying the invention.

Referring to FIG. 1, the input vector $\overline{X}$ and reference vectors $\overline{X}_1$ to $\overline{X}_M$ are entered in corresponding N-bit registers 10, the bits of a general reference vector $\overline{X}_m$ being $x_{m1}, x_{m2}, \ldots x_{mN}$. The M comparison devices are exclusive-OR gates 12 which feed analog integrators 13 through input resistors 14. Each integrator comprises a differential amplifier 15 and the input resistors are connected to the inverting inputs of these amplifiers. Integrating feedback capacitors 16 are connected to the same inputs. The other inputs are connected to a terminal 17 at a reference potential, e.g. OV.

Before the input vector $\overline{X}$ to be recognised is applied to the exclusive-OR gates bit-by-bit, the integrators are set to zero by closing M switches 18 across their capacitors. Thereafter, the first of N clock pulses applies the first bit of $\overline{X}$ to the common bus 19 or first input of each exclusive-OR gate and the first bit of the mth stored pattern vector $\overline{X}_m$ to the second input of the mth exclusive-OR gate for $m = 1, 2, 3, \cdots M$. The clock pulses from a source 20 are applied in well known manner to read out bits in succession from all the registers 10. If the registers 10 are shift registers, the pulses are applied directly as shift pulses and the registers for the reference vectors have conventional recirculation connections (not shown) such that the vectors are read out non-destructively. If the registers are random access registers, the pulses are applied to an address counter.

If a difference exists at the two inputs of the mth exclusive-OR gate, i.e., if the inputs are 1 and 0 or 0 and 1, a pulse is obtained at the output, and assuming this to be positive it will be fed into the mth integrator. Each integrator shown in FIG. 1 produces a negative output increment proportional to the area of its input pulse. Alternatively, negative pulses could be obtained when the bits are different and the integrators would then give positive outputs. If the two inputs of the mth exclusive-OR gate are the same, i.e., if the inputs are 0 and 0 or 1 and 1 the exclusive-OR gate is arranged to give zero output. An example for the very simple case of an input vector 01101 and 3 stored vectors 11011, 01111 and 01010 is illustrated in FIG. 2, but in practice there will be several hundred bits and possibly thousands of bits in each vector.

Figure 2:
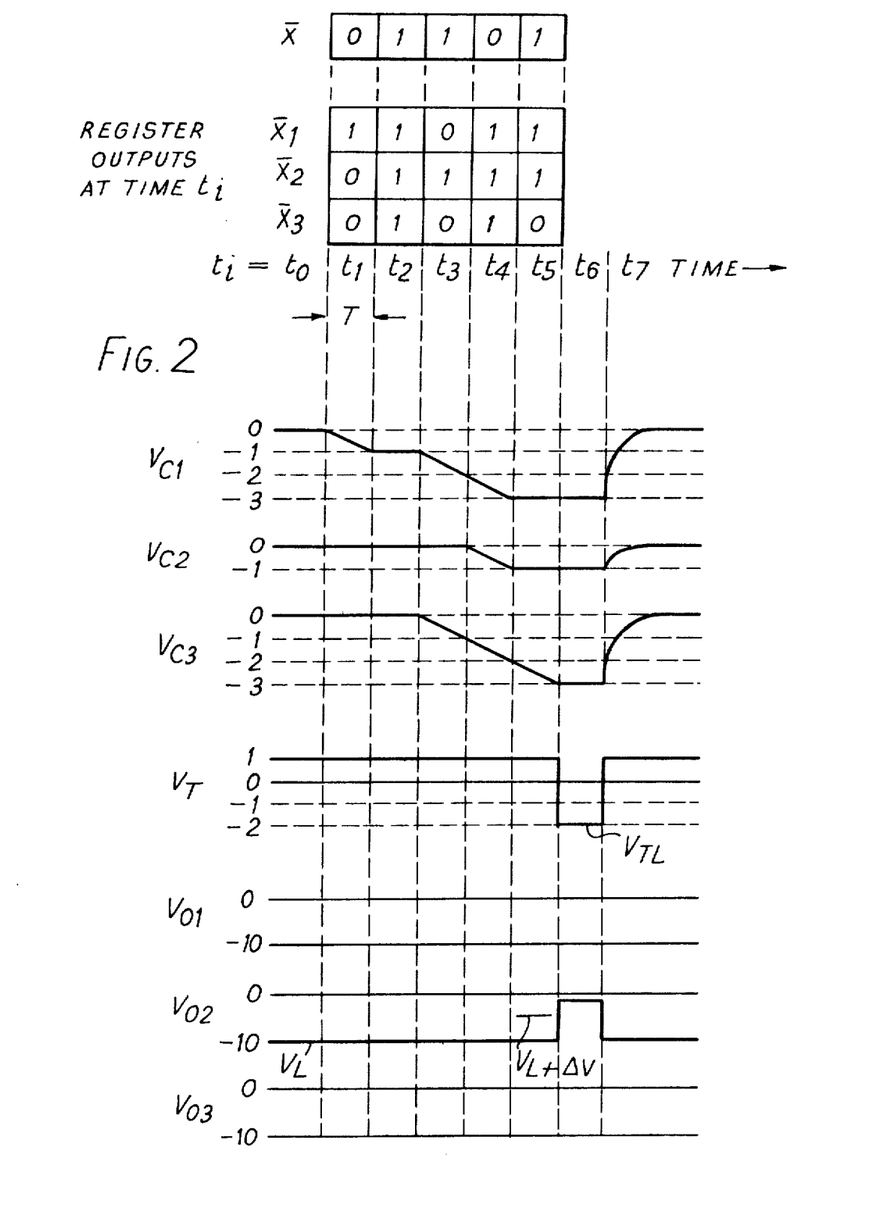
FIG. 2 shows waveforms relating to the operation of the apparatus.

Assuming positive logic output pulses forming the comparison signals from the exclusive-OR gates and that the integrator gains are adjusted to give a negative increase of unit voltage for a "1" input of one clock period duration, the integrator outputs $V_{C1}$, $V_{C2}$ and $V_{C3}$ are as shown in FIG. 2. After five (N) clock periods the voltages are $V_{C1} = -3$, $V_{C2} = -1$ and $V_{C3} = -3$.

The apparatus of FIG. 1 also comprises M+1 comparators 21, M supplied by the integrator outputs and one by a threshold voltage $V_T$ which in FIG. 2 is taken to be $V_T = +1$, i.e. one positive unit of voltage during the first M clock intervals. Throughout the sixth (N + 1)th clock period (FIG. 2), $V_T$ is reduced to a negative value, $V_{TL}$ illustrated as $-2$ units, although the chosen value depends on the application. If $V_{TL}$ is set very low then the nearest match to $\overline{X}$ is always selected automatically but if $V_{TL}$ is only slightly negative, all stored patterns may be rejected as being insufficiently similar to the input $\overline{X}$.

Each comparator comprises a differential amplifier. $V_T$ and $V_{C1}$ to $V_{CM}$ are applied to the non-inverting inputs of the differential amplifiers. The outputs of the amplifiers are connected through individual diodes 22 to a common line 23 which is connected to the inverting inputs of all the amplifiers 21. The common line 23 is connected to a source of negative bias $-V$ through a resistor 24.

In operation, the voltage applied to the inverting input of each of the amplifiers 21 is (ignoring the voltage drop across the diodes 22) equal to the output voltage of the amplifier having the most positive output which is the amplifier having the most positive (least negative) voltage at its non-inverting input. Consequently the amplifier 21 having the most positive voltage on its non-inverting input gives unity gain and so produces a positive (relatively) output signal on its terminal 25 while all other amplifiers are driven into negative saturation. These output signals are represented as $V_{O1}$ to $V_{OM}$ (corresponding to $V_{C1}$ to $V_{CM}$) and $V_{CT}$ (corresponding to $V_T$).

In FIG. 2 we see that $V_{C2}$ is $-1$ unit which is more positive than $V_{TL} = -2$ and that $V_{C1}$ and $V_{C3}$ are more negative than $V_{C2}$ and $V_{TL}$. The maximum output of the parallel maximum detector is thus obtained at $V_{O2}$ and has the value approximately equal to $V_{C2} = -1$ unit, except for a small additional contribution $V_D (\approx 0.6V)$ equal to the voltage drop across the corresponding conducting diode 22. All the remaining outputs $V_{O1}$, $V_{O3}$ and $V_{OT}$ are driven to the maximum negative limiting level of the comparators 21, illustrated at $V_L = -10$ units. Thus by representing a binary zero at the final output by $V_L$ and anything above $V_L + \Delta V$ as a binary "1" it will be seen that, taking $\Delta V$ as 5 units there is only one binary "1", i.e. at $V_{O2}$ terminal, which indicates "recognition" of the input pattern vector $\overline{X} = 01101$ as the same class as stored pattern vector $X_2 = 01111$, this being both the closest stored pattern match and also a pattern for which the discrepancy with the input does not exceed 2 ($V_{TL}$) units of Hamming distance.

The M registers 10 storing $\overline{X}_1 - - - \overline{X}_M$ and the input register storing X may take any convenient form such as bipolar or MOS transistor shift registers, charge-coupled-device (CCD) shift registers, random access memory (RAM), programmable read-only-memory (PROM) or read-only-memory ROM in the case of $\overline{X}_1 - - - \overline{X}_M$. Other possibilities are core memory and magnetic bubble domain memory. In the case of volatile memories such as RAM containing flip-flops the vectors may be stored on non-volatile magnetic tape and transferred to the memory as required when the power is switched on, since this operation usually only takes a few minutes in many practical applications such as character recognition, voice recognition and spectrum recognition.

Figures 11, 12, 13:
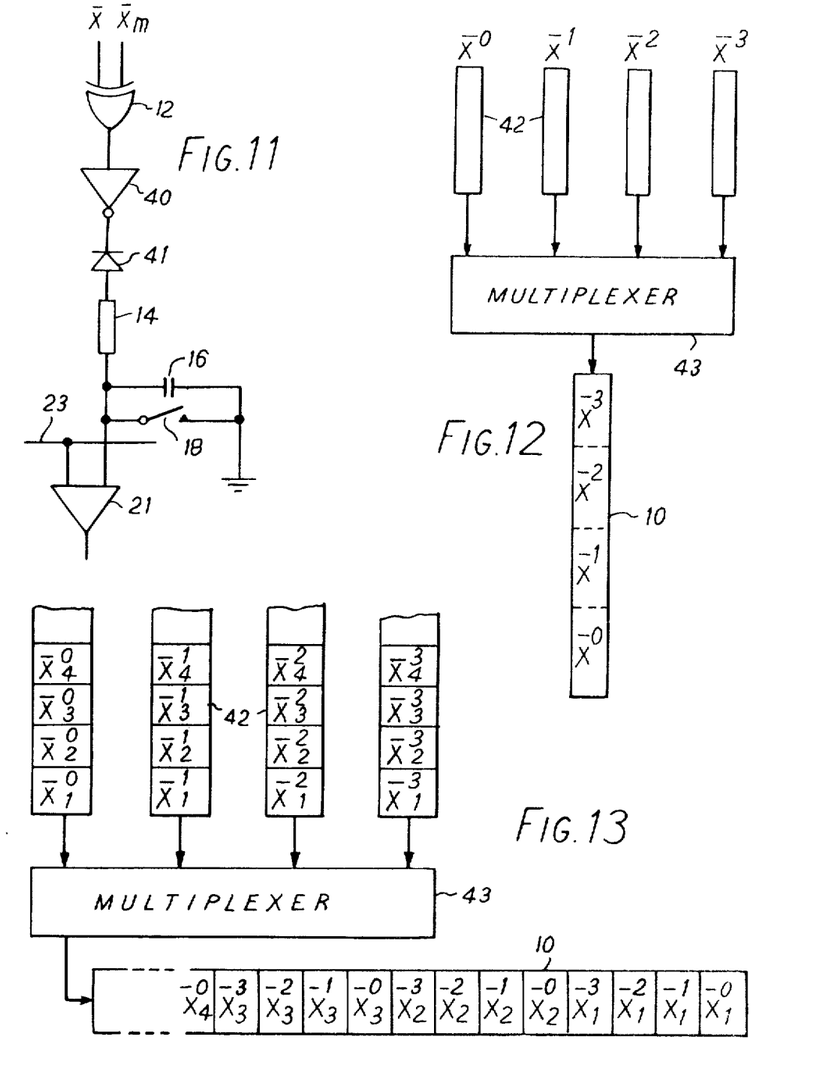
FIG. 11 shows a modification part of FIG. 1.
FIGS. 12 and 13 show circuits for assembling input data in a register.

It may be desirable to use simple RC integrators in place of the active integrators shown in FIG. 1 because of the difficulty of providing linear amplifiers 15 of adequate bandwidth for high speed operation. A suitable circuit is shown in FIG. 11 wherein the resistor 14 is fed by an inverting amplifier 40 (which can have adequate bandwidth because it is only a pulse amplifier) via a diode 41. The capacitor 16 is now simply connected, with the switch 18 thereacross, between the input to the comparator 21 and ground. The amplifier 40 can provide gain, if needed, and provides the correct (negative) polarity at the comparator input. In practice the amplifier 40 can be omitted and the capacitor 16 be charged positively provided the diode 41 is reversed. It is then also necessary to reverse the diodes 22, return the resistor 24 to +V instead of −V and invert the polarity of $V_I$.

Circumstances can arise in which the vector in the input register is a vector which should match one of the reference vectors but will fail to do so because the vector is wrongly positioned in the input register. In this situation it is necessary to effect a series of comparisons with the input vector successively shifted around the input vector register by one bit at a time by recirculation via a one-bit delay. This technique is well known per se, for example in digital correlators in chirp radar systems.

Figure 3:
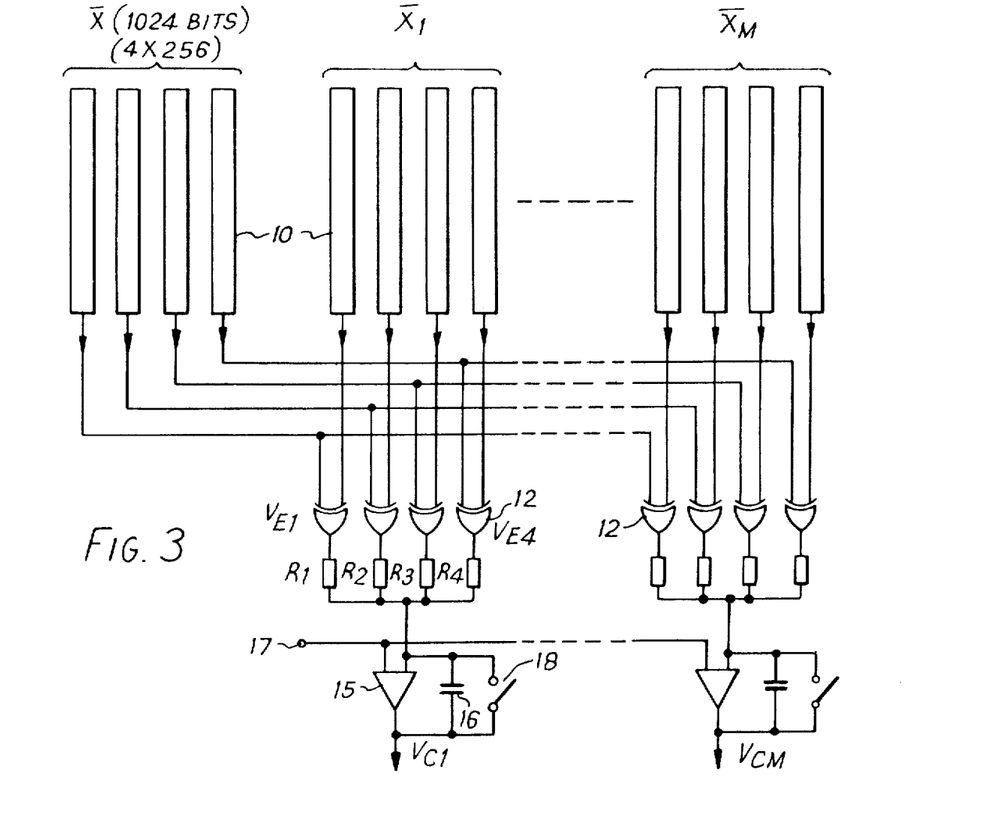
FIG. 3 shows a modified apparatus wherein $n$ is not unity but has the value of 4.

The simplicity and potentially low manufacturing cost of this new pattern recognition apparatus are further enhanced by the fact that it is readily extended to larger pattern vectors without decreasing the speed and with very few additional components. As an example of this extension consider the case illustrated in FIG. 3 in which only storage registers with 256 bit capacity are available, whereas it is necessary to recognise pattern vectors of 1024 bits. The solution is to combine four of the 256 bit registers in parallel and to summate the outputs of their four exclusive-OR gates by means of the four resistors $R_1$, $R_2$, $R_3$ and $R_4$ as shown. The increase in the integrator negative output produced by the four inputs $V_{E1}$, $V_{E2}$, $V_{E3}$, $V_{E4}$ over one time interval T is thus $$V_{CI} = -\frac{1}{C} \int_0^T \left( \frac{V_{E1}}{R_1} + \frac{V_{E2}}{R_2} + \frac{V_{E3}}{R_3} + \frac{V_{E4}}{R_4} \right) dt$$

but since the $V_E$ are exclusive-OR gate outputs, arranged for convenience to be zero volts or V volts, the value of $V_{CI}$ becomes $$V_{CI} = \frac{-V}{C} \left( \frac{A_1}{R_1} + \frac{A_2}{R_2} + \frac{A_3}{R_3} + \frac{A_3}{R_4} \right)$$

where each $A_1$ is either zero or one. The resistors $R_1$ - - - $R_4$ can all have the same value or their values can be different to give different weights to the four components of the pattern vector. In recognising an individual from several measurements such as height, length of fingers, waist and chest measurements, for example, it may be desirable to give greater importance to height measurements than to waist measurements since a 1 cm change in the latter could easily be produced by diet whereas a similar change in the height of an adult is less probable. In statistical terms the variance of weight measurements may be far greater than the variance of height measurements over a period of time this can be reflected in the choice of resistor values. Similarly in optical character recognition, certain regions of the character field may be more important than others for differentiating between characters. Thus for O and Q the bottom right hand corner has more significance and the partial pattern vector for this area can be given a lower resistance value and hence greater weight.

On the other hand, if long registers 10 (such as are now commercially available) are used, it may be desirable to serialize multibit data. A single pattern vector of length KN can be formed from K pattern vectors each of length N. Thus FIG. 12 shows four assembly registers 42 corresponding to bit weights $2^0$, $2^1$, $2^2$ and $2^3$ into which are read vectors $\overline{X}^0$, $\overline{X}^1$, $\overline{X}^2$ and $\overline{X}^3$ respectively, (K = 4). These vectors can be block serialized, as indicated in FIG. 12 and via a conventional multiplexer 43, in the input register 10 of FIG. 1. Alternatively, by multiplexing bit-by-bit, the vectors can be interlaced as shown in FIG. 13 where the cell-by-cell correspondence between the registers 42 and the register 10 is denoted by the symbols in the cells.

Figure 14:
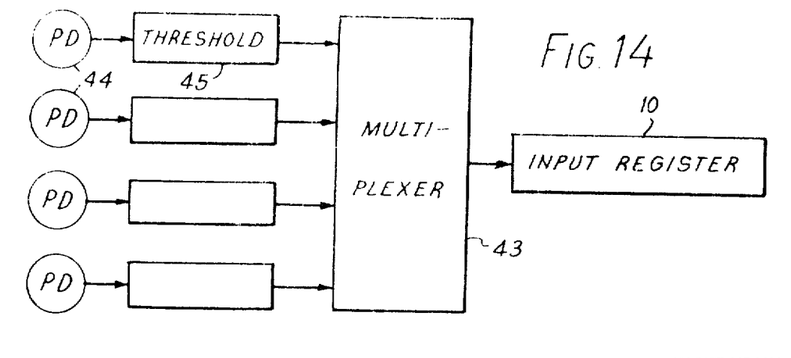
FIG. 14 shows a circuit for assembling input data from the scanning system of optical character recognition apparatus.

Assembly of bits in the manner of FIG. 13 will not necessarily require use of the assembly registers 42. Data from K single bit sources can be multiplexed in real time into the register 10. For example, FIG. 14 shows a column of four photodiodes or phototransistors 44 feeding into the multiplexer 43 via conventional threshold circuits 45 which quantize the signals into binary form. In accordance with standard OCR (optical character recognition) techniques, the cells are scanned along a line of characters and the multiplexer 43 is operated at a cycle rate appropriate to the scanning speed. In practice there will be more than four photodiodes or phototransistors 44 in the column, say tens or even hundreds, depending upon the resolution and redundancy required. Many bits will then differ from the bits of a perfect character due to paper and printing imperfections but, with high redundancy, the comparison apparatus gives correct identification, providing the input vector is within the tolerance range determined by the rejection threshold $V_T$.

Figure 4:
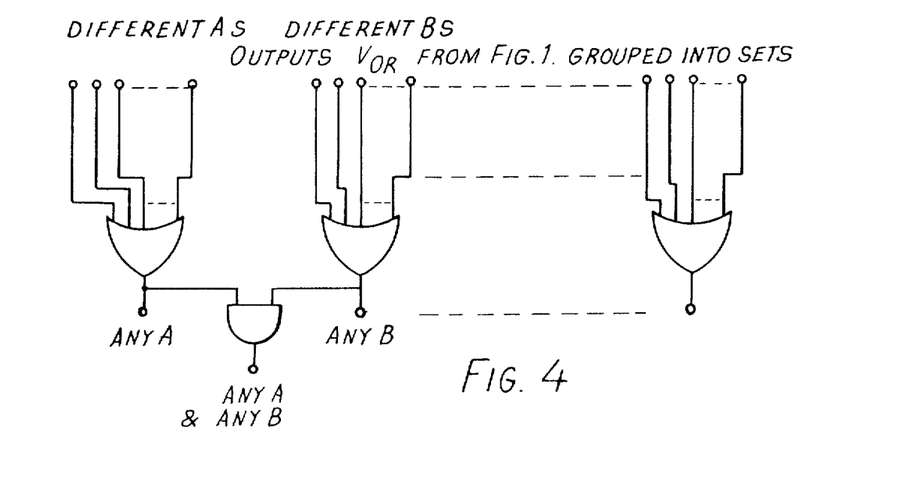
FIG. 4 shows a circuit usable with the apparatus of FIG. 1 to assign patterns to different classes.

A further facility, providing for the logical union and/or intersection of patterns, is easily achieved as illustrated in FIG. 4, by combining sets of the comparator outputs $V_{O1}$ - - - $V_{OM}$ in OR gates or in AND gates. Thus in OCR (optical character recognition) it may be required to treat a letter in many different fonts, or handwritten in many different ways, as the same letter. This result is achieved by combining a multiplicity of specimens in an OR gate. Simultaneous combinations of patterns in words or codes such as A B etc. may be dealt with by AND gates as illustrated but in this case the comparator arrangement needs to be partitioned into two halves, one for the first or left side letter and one for the second or right side letter, since a single comparator only gives one output at any instant. It is clear that the basic recognition apparatus of FIG. 1 can be applied, adapted and extended in many different ways. On the input side the pattern vectors may be obtained in a wide variety of ways. In OCR for example the character field can be covered by a matrix of photo-detectors the outputs of which are amplified and thresholded to give a binary 1 for signals above the threshold and binary 0 for signals below the threshold. An L × K matrix would thus yield pattern vectors $\overline{X}$ with N = L × K bits. If greater intensity resolution is required a number of different thresholds H may be employed to give pattern vectors $\overline{X}$ with N = L × K × H bits etc. or N = 1024 for a 16 × 16 matrix and 4 threshold values. In spectral analysis the spectrum may be quantized into K regions and the amplitude into L levels to yield pattern vectors $\overline{X}$ with N = L × K bits. Thus if K = 64 and L = 16 the pattern vectors have N = 1024 bits etc. The pattern recognition apparatus thus has great flexibility at the input side as well as at the output. The intervals chosen for L, K, H etc. can be any convenient value and need not be constant throughout the range. In particular they may be in logarithmic progression to vary sensitivity at the lower or upper end of the range and the same N bit pattern recognition apparatus can still be used.

A very significant additional facility can be obtained with minimal additional complexity, namely the ranking of pattern similarlity from the best match right down to the worst match or from the best match down to any selected level of match below which patterns are automatically rejected.

Figure 5:
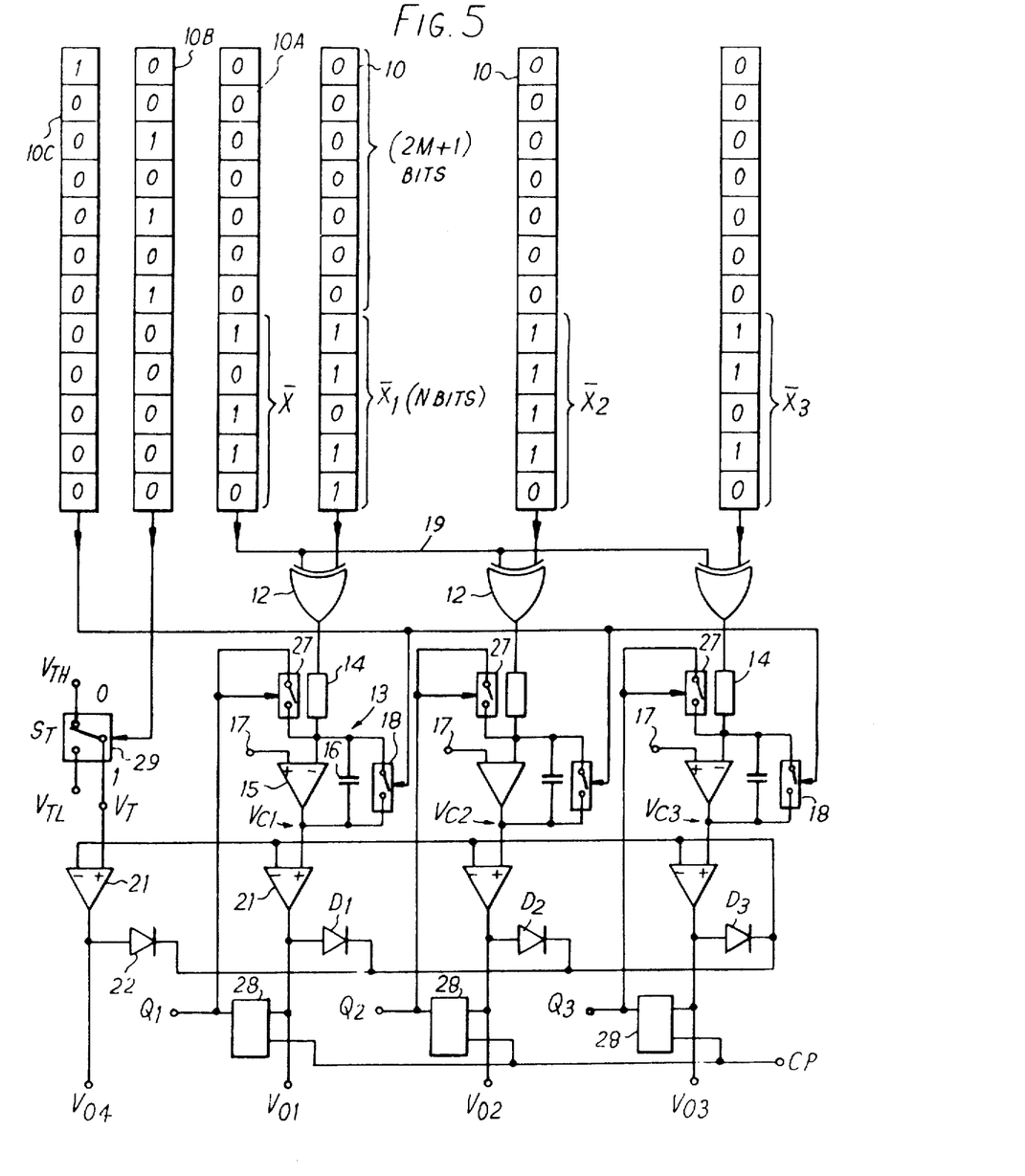
FIG. 5 illustrates a development of FIG. 1 which enables matches to be ascertained in order of rank.

The additional components are shown in FIG. 5 for the simple case of N = 5 and M = 3 which may clearly be extended to any N and M by repetition of the circuit. By comparison with the simple best-match circuit of FIG. 1 it will be seen that there are M additional switches 27 connected to supply inputs to the integrators from M bistable flip-flops 28 connected to the outputs $V_{O1}$-$V_{OM}$. All the switches are preferably electronic switches controlled by input logic levels and it is assumed that the switches 18 and 27 are normally open for a "0" control input and closed for a "1" control input, logical "0" and "1" corresponding to low and high level control voltages repectively.

Figure 6:
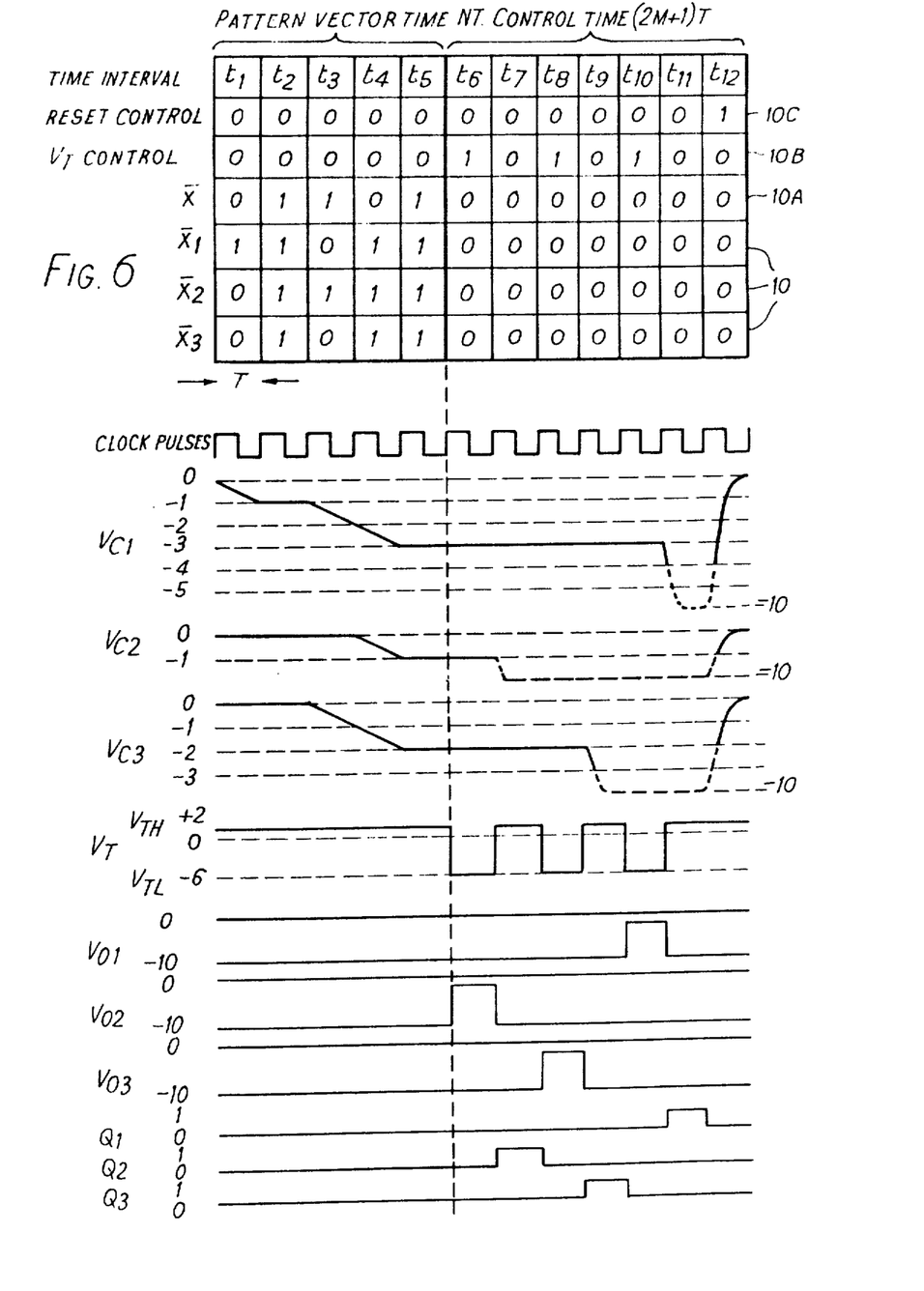
FIG. 6 shows waveforms relating to the apparatus of FIG. 5.

The output $Q_m$ of each flip-flop is fed back to the mth integrator input and also to the control input of the mth switch 27. The operation of this more advanced circuit will be illustrated by reference to the simple example shown in FIGS. 5 and 6. Assume that the pattern vector $\overline{X}$ has been read into the $\overline{X}$ register 10A and the three registers 10 for $\overline{X}_1$, $\overline{X}_2$ and $\overline{X}_3$ contain the pattern vectors shown. Thus, $\overline{X} = 01101$, $\overline{X}_1 = 11011$, $\overline{X}_2 = 01111$ and $\overline{X}_3 = 01011$. It is required to find firstly the $\overline{X}_m$ that most closely resembles $\overline{X}$, secondly the $\overline{X}_m$ that is the second best match and thirdly the $\overline{X}_m$ that is the third best match to $\overline{X}$. This result is achieved automatically by starting the clock pulses CP, the first five of which apply the N = 5 components of $\overline{X}_1$, $\overline{X}_2$ and $\overline{X}_3$ to the exclusive-OR gates 12 together with the input vector $\overline{X}$. Note that the flip-flops are giving zero outputs since the data inputs are all low (−10V). It is assumed that the flip-flops contain suitable level shifting circuits such as Zener diodes so that this low input voltage is converted to the normal logical low level which is typically near to zero volts. The control signals for all switches 27 are thus low and the switches are open so that current flows through a resistor 14 and charges a capacitor 16 to produce a negative increment at the integrator output $V_{Cm}$ for each mismatch between $\overline{X}$ and $\overline{X}_m$. The waveforms $V_{C1}$-$V_{C3}$ for the first N = 5 clock pulse positive edges are shown in FIG. 6. The required information is extracted from the final levels of these waveforms by (2M + 1) control pulses stored permanently in a $V_T$ control register 10B and a reset control register 10C. It is convenient simply to include these two additional registers, make all registers N + 2M + 1 bits long and put 0's in the first N bits of the registers 10B and 10C and in the last 2M + 1 bits of the other registers. The register length of N + 2M + 1 bits compares with a required length of N + 2 bits when it is only desired to find the closest match to the unknown.

At the (N + 1)th pulse, the $V_T$ control register contains a 1 which causes a switch 29 to change over thereby reducing $V_T$ from $V_{TH}$ to $V_{TL}$. The comparators 21 then permit the largest $V_{Cm}$ to pass through the output. In this example $V_{C2}$ is the largest, −1 unit as compared with $V_{C1} = -3$ units and $V_{C3} = -2$ units. The output pulse $V_{O2}$ indicates that $\overline{X}$ should be placed in category 2 and also makes the D input to the corresponding flip-flop 28 go high so that, on the next low to high clock pulse transistion, $Q_2$ goes high and supplies a high level input to the corresponding integrator 13 by closing its switch 27. In practice the switch will be electronic and with a low on resistance that is arranged to be much smaller than the resistor 14, with the result that the capacitor 16 is rapidly charged and $V_{C2}$ goes quickly negative to the negative saturation level, assumed to be −10V. This effectively removes $\overline{X}_2$ from the subsequent comparisons so that when $V_T$ goes low again in the next clock interval, only $\overline{X}_1$ and $\overline{X}_3$ are compared with $\overline{X}$. It is seen that $\overline{X}_3$ is closer to $\overline{X}$ than $\overline{X}_1$ since $V_{C3} = -2$ units and $V_{C1} = -3$ units. Thus the comparators 21 permit $V_{C3}$ to appear at the ouptut and make $Q_3$ high on the next clock interval. Note that $Q_1$, $Q_2$ and $Q_3$ are also available as binary outputs at standard computer logic levels ready for interfacing with any computer. The effect of $Q_3$ going high is to disable the $X_3$ channel, leaving $X_2$ to be selected last as the stored vector that least resembles the input vector $\overline{X}$.

In some applications it may be necessary to rank the best matches subject to the condition that they are no worse than a preset value. This result is also readily achieved in practice by adjusting the voltage $V_{TL}$ to a value just above the reject level. If for example $V_{TL} = -2.5$ units in FIGS. 5 and 6 then $\overline{X}_1$ would be rejected as the third possible match since it falls below −2.5 units at −3 units. An input pattern such as X = 1 0 1 0 1 would be completely rejected since the closest match of −3 units is below the reject level of 2.5 units.

Figure 7:
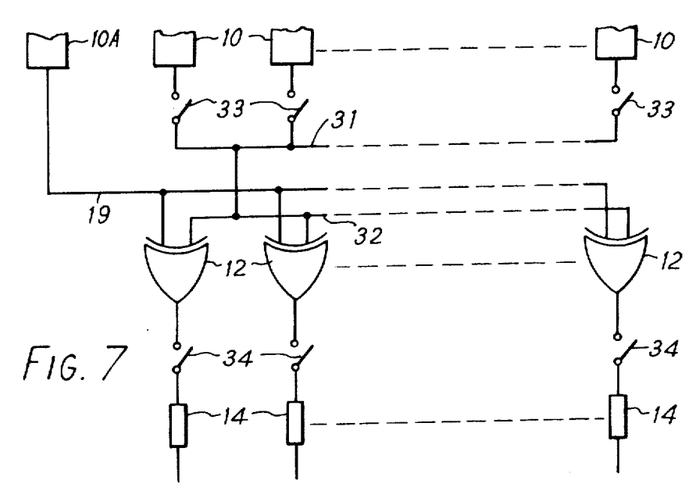
FIG. 7 illustrates a modification applicable to FIG. 1 or FIG. 5.

The relatively low cost and small size that results from employing these circuits has become feasible with the recent introduction of multiple elements in single packages such as quad operational amplifiers, flip-flops and quad elecronic switches etc. Even more important is the availability of low cost high capacity shift registers such as CCD LSI packages containing more than 16,000 bits. Such devices usually limit access to one register at a time but this necessitates only a slight modification. This is illustrated in FIG. 7 which shows the output ends of the register 10 for $\overline{X}$, the output ends of registers for $\overline{X}_1$ to $\overline{X}_M$ and the exclusive-OR gate 12 connected to the resistors 14. All M registers 10 now have a common output bus 31 which is connected to a common input bus 32 to the gates 12. The outputs of the registers 10 include switches 33 which are actually included as electronic switches in the register integrated circut as available from the manufacture. The clock source 20 (FIG. 1) now also produces pulses at M times the register clock rate. These pulses are counted and decoded in known manner to close the switches 33 in cyclic sequence so that, in each comparison cycle, the outputs of the M registers 10 are applied in cyclic sequence to the corresponding gates 12.

This produces a problem in that the output of each gate 12 will be arbitrary during the time that its switch 33 is not closed. For this reason, switches 34 are put in series with the outputs of the gates and are closed in synchronism with the corresponding switches 33. The inputs to the integrators are now scaled down to 1/Mth of the duration of the period T (FIG. 6) of the clock cycle. This would have the effect of correspondingly scaling down the output levels of the integrators. In order to compensate for this the resistors 14 in FIG. 7 can be scaled down to 1/Mth of the value of the resistors 14 in FIG. 1. The ramped level changes in $V_C$, etc. illustrated in FIGS. 2 and 6 are then of the same magnitude but occur more abruptly and in each case over the portion of the period T during which the corresponding switches 33 and 34 in FIG. 7 are closed.

Figure 8:
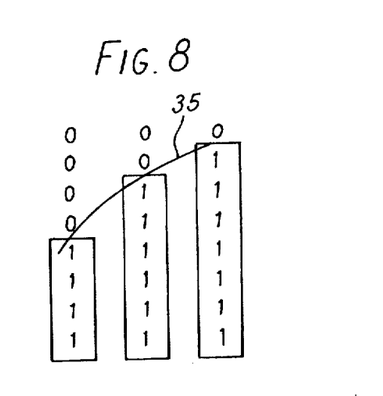
FIGS. 8 and 9 illustrate ways in which binary vectors can be derived for various applications of the invention.

We have already referred to the way in which vectors may be derived in character recognition and other applications. In general, it is immaterial how the vectors are derived but other examples showing the wide field of use of the invention will now be explained with reference to FIGS. 8 and 9. FIG. 8 shows a three-bar histogram represented by "1's" up to the height of the bars with "0's" above. The specific example shown becomes the vector 1111000011111110011111110 if the bars are taken from left to right. If the different bars are, say, different mass or wavelength components in a spectrometer or dimensions of articles of clothing and the heights are spectrometer intensities or lengths of the said dimensions, the comparison of vectors can be used to match an unknown spectogram with one of a number of reference spectograms, for the purpose of chemical analysis, or to match a persons measurements with one of a number of clothing patterns. Obviously, other parameters can be involved for matching in entirely different fields. The same form of vector can also be used to represent a curve 35, e.g. a waveform or a speech formant for use in handwriting recognition, speech recognition and other applications, a radar or sonar waveform used for aircraft or submarine identification, and so on.

Figure 9:
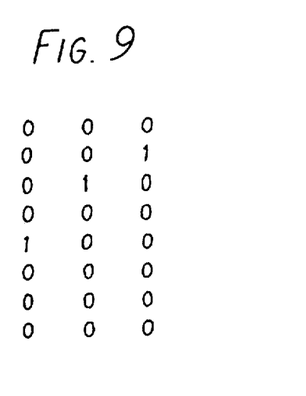

An equivalent representation is shown in FIG. 9 where there is now a "1" only at the top of each bar so that the vector becomes 0001000000000100000000010. Each bit in a column of FIG. 9 can be derived as the exclusive-OR of the corresponding bit in FIG. 8 and the bit immediately thereabove.

Figure 10:
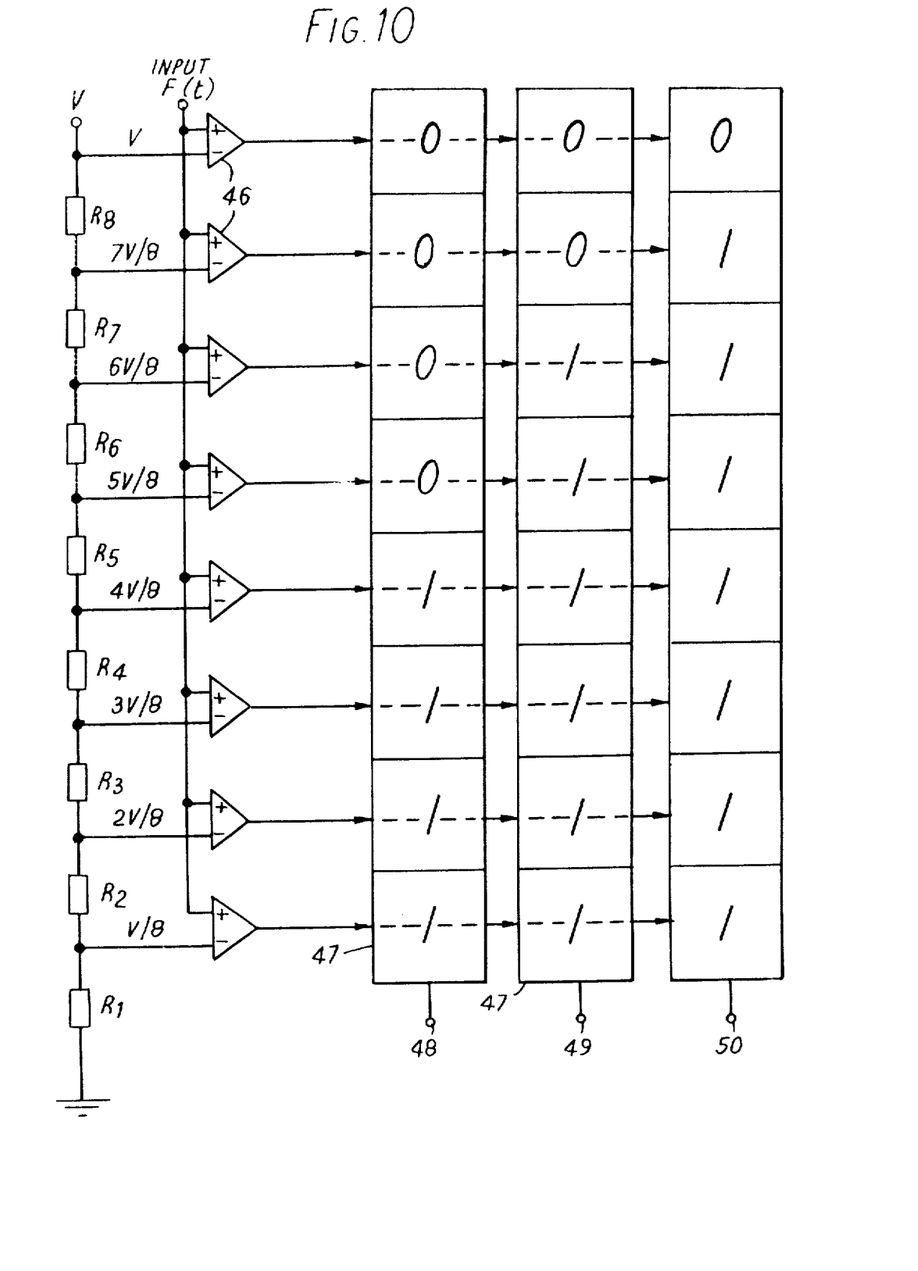
FIG. 10 illustrates a circuit for converting a series of analog values to a vector.

An analog waveform can be converted to a vector by a procedure of sampling coupled with conversion of each sample to 1's and 0's after the scheme of FIG. 8. For example, and as shown in FIG. 10, the waveform denoted F(t) can be applied to the first inputs of a plurality of comparators 46 which receive a series of reference levels at their other inputs. The reference levels are picked off a resistor potential divider chain $R_1$-$R_8$ and can form a linear or non-linear (e.g. logarithmic) series. In the illustrated example there are eight reference levels and all resistors $R_1$-$R_8$ are equal so that the levels are V/8, 2V/8, 3V/8 - - - 7V/8, where V is the voltage applied to the divider chain. The outputs of the comparators will be 1's up to a certain one of the reference levels and thereabove will be 0's. At sampling instants, the comparator outputs are loaded into successive ones of a plurality of registers 47 by the application of load pulses to terminals 48, 49, 50 - - - in succession. The registers 47 can in fact be sections of the register 10 or can be the registers 42 of FIG. 12 or FIG. 13. As illustrated, the data will be entered in the form of FIG. 8; if the form of FIG. 9 is required, each comparator must feed the corresponding register cell via an exclusive-OR gate which receives a second input from the comparator above.

Figure 15:
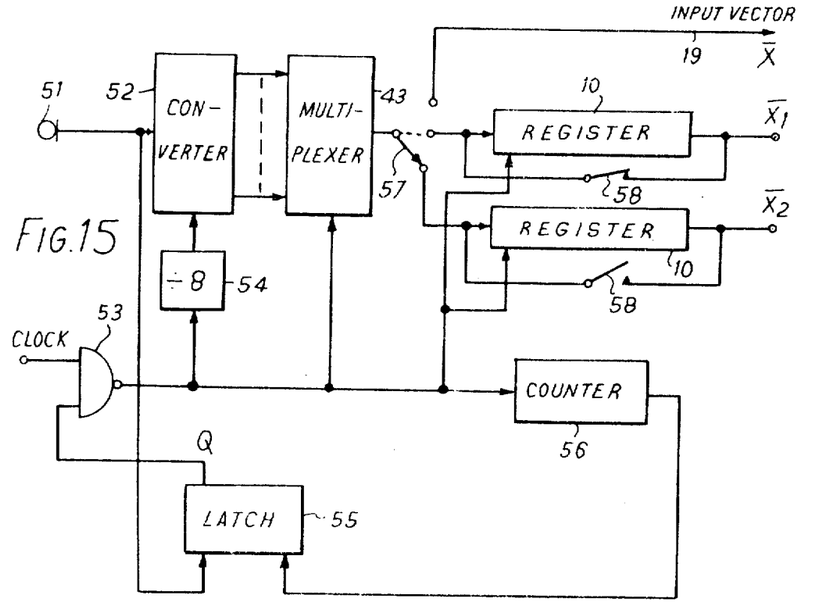
FIG. 15 shows a circuit for assembling data from speech signals.

A specific circuit for use in speed recognition is illustrated in FIG. 15. A microphone 51 provides the signal F(t) which is fed to an analog-to-digital converter 52 of the form shown in FIG. 10, comprising the comparators 46 and the potential divider chain $R_1$, $R_2$ etc. It will be understood that this converter does not convert to the binary digital equivalent of the analog input but to a "stack" of 1's of a height representing the analog input. The outputs of the converter 52 are now applied to a multiplexer 43 after the manner of FIG. 13 so that the bits are serialized in a selected register 10. To this end the registers 10 are clocked by clock pulses via a NAND gate 53 and these clock pulses also drive the multiplexer 43. The circuit 52 can include a sample buffer register for buffering the bits to be serialized by the multiplexer. This buffer register is then strobed to define the sample instants at one eighth of the clock rate (assuming an 8-bit output as in FIG. 10), via a divide-by-eight counter 54.

The gate 53 is enabled to pass the clock pulses by the Q output of a latch flip-flop 55 which is set by the appearance of a signal from the microphone 51. A counter 56 counts the clock pulses and when the number counted equals the number of stages of the register 10, the latch flip-flop 55 is reset.

The registers 10 are simply the registers for the reference vectors (FIG. 1) and for simplicity only two are shown. Any register can be connected to the output of the multiplexer 43 by a selector switch 57. When any register is so connected, its recirculation path is broken by opening a corresponding switch 58. The switch 57 can also connect the multiplexer output directly to the line 19 (FIG. 1), the input register 10 of FIG. 1 not being required because, as explained below, operation is in real time during word recognition.

Operation is as follows. The register 10 for the reference vector $X_1$, is first selected by the switch 57 and a first reference word is spoken into the microphone 51, triggering the latch flip-flop 55 and causing the reference word to be sampled with the ensuing bits clocked into the selected register 10.

Then the register 10 for the reference vector $X_2$ is selected (this is the illustrated state of the circuit) and the second reference word is spoken. This is repeated for the whole vocabulary of reference words by selection of the remaining registers 10 (not shown). The apparatus has now been taught its vocabulary, represented by the M reference vectors in the registers 10.

For use in a recognition operation, the switch 57 is positioned to select the line 19. The word to be recognised is spoken and the resulting bit pattern is sent on the line 19 to all the gates 12 (FIG. 1) which receive respective reference vector bit sequences from the registers 10. If the word matches a reference word closely enough it is identified by the signal on the corresponding one of the terminals $V_{O1}$ to $V_{OM}$ as explained in relation to FIG. 1.

The sampling rate may be 2 KHz. Since each sample provides 8 bits, 1 second of speech would provide 2000 × 8 = 16000 bits, i.e. the registers 10 would have to be 16000 bits long. This register length is today feasible on a single chip. Many useful words, however, last only a fraction of a second and require less storage. The real time speed of operation is independent of how large M is made. Real time operation is obviously possible in many other applications, including OCR, with the photodiode outputs applied to the multiplexer 43 in FIG. 15.

It will be recognised by those skilled in the art that the circuits described herein provide the hardware necessary to implement a nearest neighbour city block distance classifier.

I claim:

1. Apparatus for comparing vectors, comprising means defining a plurality of $n.M$ shift registers for storing a plurality M of reference vectors each having N components represented by corresponding groups of $n$ bits, where N and M are integers greater than 1, and $n$ is selected from the group of small integers including unity, each shift register having a single bit output, means additional to said $n.M$ shift registers for supplying an input vector also having N components represented by corresponding groups of $n$ bits, M comparison devices each adapted to compare $n$ bits of said input vector with $n$ bits of its corresponding one of said M reference vectors and to provide a comparison signal representing the results of the comparison, means operative in a succession of comparison operations to present the bits of the input vector $n$ at a time, simultaneously to the respective comparison devices of all M said reference vectors and concurrently to present the corresponding bits of the reference vectors from the single bit outputs of said registers to the respective comparison devices, and a plurality M of summating devices operative to accumulate output signals in response to the comparison signals from the M comparison devices respectively and to provide such output signals at the conclusion of the comparison operations, that output signal whose value is at one extreme of the range of values of the output signals denoting the one of the M reference vectors with which the input vector makes the closest match.

2. Apparatus according to claim 1, wherein the input vector is also held in an input register from which the input vector bits are read out in synchronism with the reading of bits from the reference vector registers.

3. Apparatus according to claim 1, wherein $n$ is unity, the vectors are binary words, M reference vectors of N-bits each are held in M, N-bit registers and comprising means arranged to read the reference vectors bit by bit out of the registers under control of clock pulses in synchronism with the presentation to the comparison devices of the bits of the input vector, the comparison devices being arranged to compare the input vector bits with the reference vector bits in parallel.

4. Apparatus according to claim 3, wherein each comparison device is an exclusive OR gate.

5. Apparatus according to claim 4, wherein each summating device is an analog integrator.

6. Apparatus according to claim 5, including M match comparators driven by said output signals of respective ones of said M summating devices for triggering of the one of said match comparators whose reference vector best matches the input vector, and further including means for ranking pattern similarity from best match down to a selected level of match and comprising M flip-flops each having an input connected to the output of the corresponding one of said M match comparators, M switches each responsive to the output of the corresponding one of said M flip-flops for applying such output to the corresponding one of said M summating devices, switch means actuable for resetting said M summating devices, and control register means synchronized with said M referrence vector registers for actuating said reset switch means.

7. Apparatus according to claim 1, wherein the vectors are words having $n$-bit bytes where $n$ is greater than 1, groups of $n$ registers store the components of the vectors in byte-serial, bit-parallel form, and comprising means arranged to read the reference vectors byte by byte out of the registers under control of clock pulses in synchronism with the presentation to the comparison devices of bytes of the input vector, the comparison devices being arranged to compare the input vector bytes with the reference vector bytes.

8. Apparatus according to claim 7, wherein each comparison device comprises $n$ exclusive OR gates to which are applied respective bits of each input vector byte and respective bits of each reference vector byte from the corresponding register.

9. Apparatus according to claim 8, wherein each summating device comprises an analog integrator having a summing input connected to outputs of all exclusive OR gates of the corresponding comparison devices.

10. Apparatus according to claim 1, comprising a source of vectors operative to provide a succession of sets of parallel vector components, and a multiplexer arranged to multiplex the components in serial form and to enter the serialized components in one of said registers.

11. Apparatus according to claim 10, comprising switching means adapted to connect the output of the multiplexer to any selected one of the reference vector registers.

12. Apparatus according to claim 11, including an analog-to-digital converter defining said vector source, a NAND gate, a latch flip-flop set by the onset of an input to said converter, a clock operable through said NAND gate for controlling said converter and multiplexer and registers, a counter responsive to a number of clock pulses corresponding to the number of stages of said selected register for resetting said latch flip-flop, said latch flip-flop being connected to disable said NAND gate when reset.

13. Apparatus according to claim 1, wherein the input vector is also held in an input register from which the input vector components are read out in synchronism with the reading of components from the reference vector registers, and comprising a source of a vector operative to provide a succession of sets of parallel vector components, and a multiplexer arranged to multiplex the components in serial form and to enter the serialized components in the input register.

14. Apparatus according to claim 1, comprising a plurality of sensors arranged to scan characters to be recognized to provide the components of the input vector.

15. Apparatus according to claim 1, comprising means for periodically sampling a waveform to provide a succession of analog samples and an analog to digital converter arranged to convert each sample to a digital value consisting of a plurality of the components of a vector.

16. Apparatus according to claim 1, in which $n$ is less than N.